United States Patent
Nakamura

(10) Patent No.: US 12,521,972 B2
(45) Date of Patent: Jan. 13, 2026

(54) PHOTOCURABLE RESIN COMPOSITION, IMAGE DISPLAY DEVICE, AND IMAGE DISPLAY DEVICE MANUFACTURING METHOD

(71) Applicant: DEXERIALS CORPORATION, Tokyo (JP)

(72) Inventor: Tsukasa Nakamura, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/314,970

(22) PCT Filed: Jul. 25, 2017

(86) PCT No.: PCT/JP2017/026795
§ 371 (c)(1),
(2) Date: Jan. 3, 2019

(87) PCT Pub. No.: WO2018/025700
PCT Pub. Date: Feb. 8, 2018

(65) Prior Publication Data
US 2019/0275773 A1    Sep. 12, 2019

(30) Foreign Application Priority Data
Aug. 1, 2016 (JP) ................................ 2016-151290

(51) Int. Cl.
*B32B 27/30* (2006.01)
*C08F 290/06* (2006.01)
(Continued)

(52) U.S. Cl.
CPC ............ *B32B 27/30* (2013.01); *C08F 290/06* (2013.01); *G02B 5/30* (2013.01); *G02F 1/1333* (2013.01);
(Continued)

(58) Field of Classification Search
CPC .......... B32B 27/30; C08F 290/06; C08F 2/50; C08F 220/18; C08F 220/26; C08F 220/36;
(Continued)

(56) References Cited

U.S. PATENT DOCUMENTS 10,025,184 B2    7/2018   Iwata et al.
10,557,065 B2    2/2020   Niiyama et al.
(Continued)

FOREIGN PATENT DOCUMENTS

CN    103249552 A    8/2013
CN    103886806 A    6/2014
(Continued)

OTHER PUBLICATIONS

Mar. 23, 2020 Notification of Reasons for Refusal issued in Japanese Patent Application No. 2016-151290.
(Continued)

*Primary Examiner* — Sophie Hon
(74) *Attorney, Agent, or Firm* — Oliff PLC

(57) ABSTRACT

To suppress discoloration of a polarizing plate under high-temperature environments, provided is a photocurable resin composition for use in a cured resin layer of an image display device having an image display member, the cured resin layer, and a light transmitting member, in this order, the image display member including a polarizing plate. The photocurable resin composition has a water vapor transmission rate of 400 g/m²/day or more after curing, at a thickness of 0.3 mm, and under a 40° C. and 90% relative humidity environment.

9 Claims, 7 Drawing Sheets

(51) Int. Cl.
*G02B 5/30* (2006.01)
*G02F 1/1333* (2006.01)
*G02F 1/1335* (2006.01)
*G02F 1/35* (2006.01)
*G09F 9/00* (2006.01)

(52) U.S. Cl.
CPC ...... *G02F 1/133528* (2013.01); *G02F 1/3501* (2013.01); *G09F 9/00* (2013.01); *C09K 2323/057* (2020.08); *G02F 1/3505* (2021.01)

(58) Field of Classification Search
CPC ...... C08F 220/343; C08F 265/06; G09F 9/00; G02B 5/30; G02F 1/1333; G02F 1/133528; G02F 1/3501; G02F 2001/3505; C08K 5/0016; C08K 5/053; C09K 2323/057
See application file for complete search history.

(56) References Cited

U.S. PATENT DOCUMENTS

| | | | | |
|---|---|---|---|---|
| 2005/0176842 | A1* | 8/2005 | Graichen | ............... C09J 175/16 522/178 |
| 2006/0204679 | A1* | 9/2006 | Jones | ....................... C08J 5/005 428/1.3 |
| 2013/0273267 | A1 | 10/2013 | Niiyama et al. | |
| 2014/0111859 | A1* | 4/2014 | Duraes | .................... G02B 1/105 427/163.1 |
| 2014/0178619 | A1* | 6/2014 | Niiyama | .................. B32B 37/12 428/40.1 |
| 2014/0185135 | A1* | 7/2014 | Fukagawa | ............... B32B 23/20 359/361 |
| 2014/0290849 | A1* | 10/2014 | Hayashi | ................. C09J 175/16 156/273.5 |
| 2015/0301253 | A1* | 10/2015 | Henry | .................... C09D 5/002 427/508 |
| 2016/0091791 | A1* | 3/2016 | Iwata | .................. C08F 290/067 156/275.5 |
| 2016/0103262 | A1* | 4/2016 | Kashiwagi | ........... G02B 6/0053 362/607 |
| 2017/0253780 | A1* | 9/2017 | Wang | ........................ B32B 7/12 |
| 2019/0275773 | A1* | 9/2019 | Nakamura | ............. C08F 290/06 |
| 2020/0109324 | A1 | 4/2020 | Niiyama et al. | |

FOREIGN PATENT DOCUMENTS

| | | | | | |
|---|---|---|---|---|---|
| JP | H0990124 | A | * | 4/1997 | ............... G02B 5/30 |
| JP | 2009198811 | A | * | 9/2009 | |
| JP | 2010065232 | A | * | 3/2010 | |
| JP | 2013047296 | A | * | 3/2013 | |
| JP | 2013-231979 | A | | 11/2013 | |
| JP | 2014-118508 | A | | 6/2014 | |
| JP | 2014-139297 | A | | 7/2014 | |
| JP | 2014-222350 | A | | 11/2014 | |
| JP | 2014-237745 | A | | 12/2014 | |
| JP | 6898715 | B2 | * | 7/2021 | ........... G02F 1/1333 |
| KR | 102179246 | B1 | * | 11/2020 | ......... C08F 220/343 |
| KR | 102467401 | B1 | * | 11/2022 | ........... C08F 220/18 |
| TW | I815795 | B | * | 9/2023 | ............. G02B 5/305 |
| WO | 2013/057957 | A1 | | 4/2013 | |
| WO | WO-2014196355 | A1 | * | 12/2014 | ........... G03F 7/0005 |
| WO | 2015/159957 | A1 | | 10/2015 | |

OTHER PUBLICATIONS

Oct. 28, 2019 Notification of Reason for Refusal issued in Korean Patent Application No. 10-2018-7035921.
Oct. 3, 2017 International Search Report issued in International Patent Application No. PCT/JP2017/026795.
Oct. 23, 2020 Office Action issued in Chinese Patent Application No. 201780043915.2.
Aug. 3, 2021 Office Action issued in Korean Patent Application No. 10-2021-7015793.
Jun. 16, 2021 Office Action issued in Chinese Patent Application No. 201780043915.2.
Jan. 29, 2021 Office Action issued in Taiwanese Patent Application No. 106125298.
Nov. 22, 2021 Decision of Rejection issued in Chinese Patent Application No. 201780043915.2.
Nov. 25, 2021 Decision of Rejection issued in Taiwanese Patent Application No. 11021154510.
Feb. 4, 2022 Office Action issued in Korean Patent Application No. 10-2021-7015793.
Apr. 12, 2022 Office Action issued in Chinese Patent Application No. 201780043915.2.
Nov. 30, 2023 Office Action issued in Japanese Patent Application No. 2023-062555.
Sep. 15, 2022 Office Action issued in Chinese Patent Application No. 201780043915.2.

* cited by examiner ated in FIG. 1, is provided with an image display member
PHOTOCURABLE RESIN COMPOSITION, IMAGE DISPLAY DEVICE, AND IMAGE DISPLAY DEVICE MANUFACTURING METHOD

TECHNICAL FIELD

The present disclosure relates to a photocurable resin composition, an image display device, and a method for manufacturing an image display device. This application claims priority to Japanese Patent Application No. 2016-151290 filed on Aug. 1, 2016, the entire contents of which are hereby incorporated by reference.

BACKGROUND ART

Image display devices can be manufactured, for example, as described in the following (for example, see PLT 1). First, a photocurable resin composition is arranged between an image display member and a light transmitting member to form a resin composition layer. Then, the resin composition layer is cured by irradiating with light to form a cured resin layer. The image display device is thus manufactured by adhering/laminating the image display member and light transmitting member via the cured resin layer.

A conventional image display device 100, such as illustrated in FIG. 1, is provided with an image display member 4, a cured resin layer 101, and a light transmitting member 5, in this order. The image display member 4 typically has a polarizing plate 2 formed on a viewing side surface of an image display cell 3. The polarizing plate 2, such as illustrated in FIG. 2, is a laminated structure having a polarizer 8 sandwiched between a protective layer 9 and a protective layer 10.

However, the present inventor has found that the polarizing plate 2 of the conventional image display device 100 can be discolored under high-temperature conditions.

CITATION LIST

Patent Literature

PLT 1: Japanese Unexamined Patent Application Publication No. 2014-222350

SUMMARY OF INVENTION

Technical Problem

In view of such conventional circumstances, an object of the present disclosure is to provide a photocurable resin composition, an image display device, and a method for manufacturing an image display device capable of suppressing discoloration of a polarizing plate under a high-temperature environment.

Solution to Problem

A photocurable resin composition according to the present disclosure is for use in a cured resin layer of an image display device having an image display member, the cured resin layer, and a light transmitting member, in this order, the image display member including a polarizing plate, wherein the photocurable resin composition has a water vapor transmission rate of 400 g/m²/day or more after curing, at a thickness of 0.3 mm, and under a 40° C. and 90% relative humidity environment.

An image display device according to the present disclosure includes an image display member, a cured resin layer, and a light transmitting member, in this order, the image display member including a polarizing plate, wherein the cured resin layer has a water vapor transmission rate of 400 g/m²/day or more, at a thickness of 0.3 mm, and under a 40° C. and 90% relative humidity environment.

A method for manufacturing an image display device according to the present disclosure includes a step of applying the photocurable resin composition described above to a surface of a light transmitting member or to a surface of an image display member, a step of pasting the image display member and the light transmitting member via the photocurable resin composition, and a step of curing the photocurable resin composition.

Advantageous Effects of Invention

According to the present disclosure, discoloration of a polarizing plate under a high-temperature environment can be suppressed.

DESCRIPTION OF EMBODIMENTS

Photocurable Resin Compositions

Figure 1:
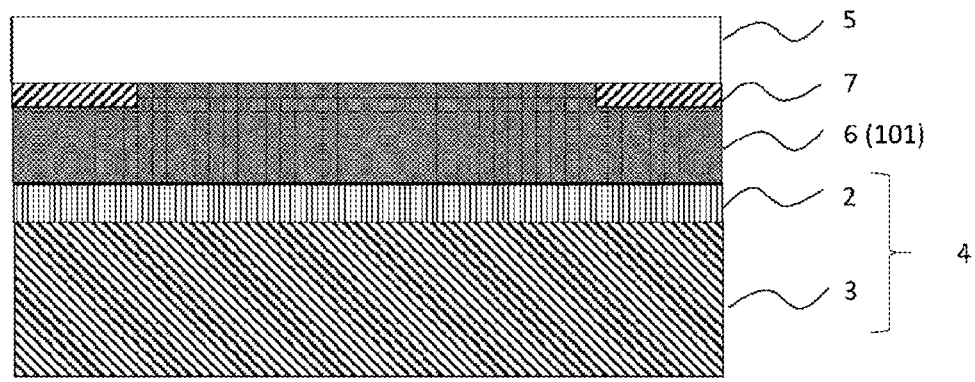
FIG. 1 is a cross-sectional view illustrating one example of an image display device.

A photocurable resin composition according to the present embodiment has a water vapor transmission rate of 400 g/m²/day or more, preferably 500 g/m²/day or more, more preferably 600 g/m²/day or more, and still more preferably 700 g/m²/day or more after curing, at a thickness of 0.3 mm, and under a 40° C. and 90% relative humidity environment. The upper limit on the water vapor transmission rate of the photocurable resin composition after curing is without particular restriction but may be 1,000 g/m²/day or less. Herein, water vapor transmission rate means a water vapor transmission rate measured under a 40° C. and 90% relative humidity atmosphere in accordance with JIS Z 0208. Using such a photocurable resin composition can suppress discoloration of a polarizing plate 2, such as in an image display device 1 illustrated in FIG. 1, in a high-temperature environment.

A cured product of the photocurable resin composition means, for example, a cured product formed by photoradical polymerization in air of the photocurable resin composition having an average reaction percentage (curing percentage) of 90% or more (and preferably 97% or more) throughout the entire cured product. The reaction percentage throughout the entire cured product of the photocurable resin composition means the reaction percentage measured in a cured product formed in a film, for example, having a thickness of 0.3 mm.

Herein, the reaction percentage is the ratio (consumption ratio) representing a relation between the amount of (meth)acryloyl groups remaining after irradiation with light and the amount of (meth)acryloyl groups existing in the photocurable resin composition layer before irradiation with light. Larger reaction percentage values indicate increased extents of reaction. In particular, the reaction percentage can be calculated according to the following formula where (X) is the absorption peak height at 1,640 to 1,620 cm$^{-1}$ from the baseline of the FT-IR measurement chart of the photocurable resin composition layer before irradiation with light and (Y) is the absorption peak height at 1,640 to 1,620 cm$^{-1}$ from the baseline of the FT-IR measurement chart of the photocurable resin composition layer (cured resin layer) after irradiation with light.

Reaction Percentage (%)=[(X−Y)/X]*100

Figure 2:
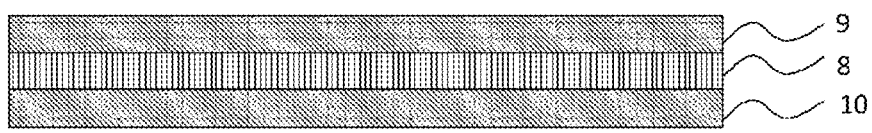
FIG. 2 is a cross-sectional view illustrating one example of a polarizing plate used in an image display device.

FIG. 1 is a cross-sectional view illustrating one example of an image display device. FIG. 2 is a cross-sectional view illustrating one example of a polarizing plate used in an image display device. A photocurable resin composition according to the present embodiment, when used in a cured resin layer 6 (refer to FIG. 1) of, for example, an image display device 1 illustrated in FIG. 1, can increase the water vapor transmission rate of the cured resin layer 6. This facilitates discharge of water generated on the polarizing plate 2 to the exterior of the image display device 1 via the cured resin layer 6 when under a high-temperature environment and can suppress contact of water generated on the polarizing plate 2 (such as on a protective layer 9 or a protective layer 10) with a polarizer 8. Accordingly, discoloration of the polarizing plate 2 of the image display device 1 under a high-temperature environment can be suppressed.

Hereinafter, an example configuration of the photocurable resin composition will be explained. So long as the water vapor transmission rate condition after curing as described above is satisfied, the photocurable resin composition is without particular limitation. In addition to increasing water vapor transmission rates in cured products, the photocurable resin composition is preferably made of components having good compatibility. For example, the photocurable resin composition preferably includes a (meth)acrylate resin, a monofunctional monomer, a photoinitiator, and a plasticizer. Herein, (meth)acrylate includes both methacrylate and acrylate.

(Meth)acrylate Resin

A (meth)acrylate resin is a photocurable resin (polymer) having two or more (meth)acryloyl groups per molecule. In view of compatibility, the (meth)acrylate resin preferably contains at least one of a polyether urethane (meth)acrylate resin and a polyester urethane (meth)acrylate resin. The (meth)acrylate resin may be a polymer or may be an oligomer.

The polyether urethane (meth)acrylate resin is a urethane (meth)acrylate resin having a polyether skeleton in the main chain and particular examples include urethane (meth)acrylate oligomers having a polyether skeleton. Examples of commercially available products include ART RESIN UN-6200, UN-6202, UN-6300, and UN-6301 (Negami Chemical Industries Co., Ltd.)

The polyester urethane (meth)acrylate resin is a urethane (meth)acrylate resin having a polyester skeleton in the main chain and particular examples include urethane (meth)acrylate oligomers having a polyester skeleton. Examples of commercially available products include ART RESIN UN-7600 and UN-7700 (Negami Chemical Industries Co., Ltd.).

Weight average molecular weight of the (meth)acrylate resin is, for example, preferably 1,000 to 100,000, more preferably 5,000 to 40,000, and still more preferably 10,000 to 25,000.

Content of the (meth)acrylate resin in the photocurable resin composition is preferably 5 to 50% by mass and more preferably 20 to 45% by mass. In particular, with respect to the total content of the (meth)acrylate resin, the total content of the polyether urethane (meth)acrylate resin and the polyester (meth)acrylate resin is preferably 40% or more by mass, more preferably 50% or more by mass, and still more preferably 80% or more by mass. (Meth)acrylate resins may be used individually or in a combination of two or more. In the case of using two or more (meth)acrylate resins, the total content of these is preferably within the ranges specified above.

Monofunctional Monomer

The monofunctional monomer is, for example, a photocurable (meth)acrylate monomer. Moreover, in view of increasing water vapor transmission rates in cured products of the photocurable resin composition as well as compatibility with other components, the monofunctional monomer preferably contains at least one of a hydroxyl group-containing (meth)acrylate monomer and a heterocycle-containing (meth)acrylate monomer.

Particular examples of the hydroxyl group-containing (meth)acrylate monomer include 2-hydroxyethyl (meth)acrylate, 1-hydroxyethyl (meth)acrylate, 2-hydroxypropyl (meth)acrylate, 3-hydroxypropyl (meth)acrylate, 1-hydroxypropyl (meth)acrylate, 4-hydroxybutyl (meth)acrylate, and phenyl glycidyl ether (meth)acrylate, among others.

The heterocycle in the heterocycle-containing (meth)acrylate monomer preferably contains at least one of an oxygen atom or a nitrogen atom as a heteroatom. The heterocyclic ring is preferably a 3- to 8-membered ring and more preferably a 3- to 6-membered ring. The carbon number of the heterocycle is preferably 2 to 6 and more preferably 3 to 5. The heterocycle may be monocyclic or polycyclic. Moreover, the heterocyclic ring may have a substituent. Examples of usable substituents include methyl groups and ethyl groups, among others.

The heterocycle-containing (meth)acrylate monomer is preferably a (meth)acrylate containing a heterocycle selected from the group consisting of morpholine rings, furan rings, and dioxalane rings. In particular, examples include acryloyl morpholine, tetrahydrofurfuryl (meth)acrylate, and (2-methyl-2-ethyl-1,3-dioxolan-4-yl) methyl (meth)acrylate, among others.

Content of the monofunctional monomer in the photocurable resin composition is preferably 10 to 40% by mass and more preferably 20 to 40% by mass. In particular, with respect to the total content of the monofunctional monomer, the total content of the hydroxyl group-containing (meth)acrylate monomer and heterocycle-containing (meth)acrylate monomer is preferably 40% or more by mass, more preferably 50% or more by mass, and still more preferably 80% or more by mass. The monofunctional monomer may be used individually or in a combination of two or more. In the case of using two or more monofunctional monomers, the total content of these is preferably within the ranges specified above.

Photoinitiator

The photoinitiator is preferably a photoradical initiator and preferably contains at least one of an alkylphenone photoinitiator and an acylphosphine oxide photoinitiator. Examples of alkylphenone photoinitiators which can be used include 1-hydroxy-cyclohexyl-phenyl-ketone (IRGACURE 184, BASF Japan Ltd.) and 2-hydroxy-1-{4-[4-(2-hydroxy-2-methyl-propionyl)-benzyl]-phenyl}-2-methyl-1-propan-1-one (IRGACURE 127, BASF Japan Ltd.), among others. Examples of acylphosphine oxide photoinitiators which may be used include 2,4,6-trimethylbenzoyl diphenylphosphine oxide (IRGACURE TPO, BASF Japan Ltd.), among others. Additionally or alternatively, other photoinitiators such as benzophenone and acetophenone may be used.

Content of the photoinitiator with respect to 100 pts. mass of the radical polymerizing component (the (meth)acrylate resin and monofunctional monomer) is preferably 0.1 to 5 pts. mass and more preferably 0.2 to 3 pts. mass. Selecting such a range can more effectively prevent both insufficient curing when irradiating with light and increased outgassing due to cleavage. These photoinitiators may be used individually or in a combination of two or more. In the case of using two or more photoinitiators, the total content of these is preferably within the ranges specified above.

Plasticizer

Plasticizers are, for example, not photocured by light themselves but impart flexibility to the cured resin layer after photocuring. In view of compatibility with other components, the plasticizer preferably contains at least one of a polyether polyol and a polyester polyol.

Examples of polyether polyols which can be used include typical polyether polyols obtained by addition polymerization of initiators such as ethylene glycol, propylene glycol, glycerin, or trimethylolpropane with an alkylene oxide. The alkylene oxide is without particular limitation and examples include ethylene oxide, propylene oxide, and butylene oxide, among others.

Commercial examples of polyether polyols include "ADEKA POLYETHER" available from ADEKA CORPORATION. In particular, examples include the "P series" of polypropylene glycol, the "BPX series" of polypropylene glycol adduct of bisphenol A, the "G series" of polypropylene glycol adduct of glycerin, the "T series" of polypropylene glycol adduct of trimethylpropane, the "EDP series" of polypropylene glycol adduct of ethylene diamine, the "SP series" of polypropylene glycol adduct of sorbitol, the "PR series" of a random copolymer of ethylene oxide and propylene oxide, and the "CM series" of a propylene oxide-ethylene oxide block copolymer added to propylene glycol, among others.

The polyether polyol preferably has a weight average molecular weight of, for example, 500 to 8,000 and more preferably 1,000 to 5,000.

Examples of polyester polyol which can be used include polyester polyol obtained by subjecting a dicarboxylic acid and a diol to condensation polymerization. Examples of dicarboxylic acid include aliphatic carboxylic acids such as adipic acid, axelaic acid, sebacic acid, and dodecanedioic acid as well as aromatic carboxylic acids such as terephthalic acid and isophthalic acid. Examples of diols include linear diols such as ethylene glycol, 1,4-butanediol, 1,6-hexanediol, 1,9-nonanediol, and diethylene glycol as well as 1,2-propylene glycol, 1,3-butylene glycol, 2-methyl-1,3-propanediol, neopentyl glycol, 3-methyl-1,5-pentanediol, 2,2-dimethyl-1,3-propanediol, and 2-methyl-1,8-octanediol, among others.

Examples of commercially available polyester polyols include "P-1010," "P-2010," "P-3010," and "P-2050" available from KURARAY CO., LTD., "OD-X-102," "OD-X-668," and "OD-X-2068" available from DIC CORPORATION, and "NS-2400," "YT-101," "F7-67," "#50," "F1212-29", "YG-108," "V14-90," and "Y65-55" available from ADEKA CORPORATION, among others.

The polyester polyol preferably has a weight average molecular weight of 500 to 8,000 and more preferably 1,000 to 5,000.

Content of the plasticizer in the photocurable resin composition is preferably 15 to 50% by mass and more preferably 25 to 45% by mass. In particular, with respect to the total content of the plasticizer, the total content of the polyether polyol and polyester polyol is preferably 40% or more by mass, more preferably 50% or more by mass, and still more preferably 80% or more by mass. The plasticizer may be used individually or in a combination of two or more. In the case of using two or more plasticizers, the total content of these is preferably within the ranges specified above.

Antioxidant

An antioxidant is used, for example, to prevent discoloration of the photocurable resin composition. The antioxidant is without particular limitation and known antioxidants may be used. Examples include compounds having a hindered phenol structure, compounds having a hindered amine structure, and compounds having a thioether structure, among others; compounds having a hindered phenol structure are preferable.

Examples of commercially available compounds having a hindered phenol structure, which are an example of an antioxidant, are "IRGANOX 1010," "IRGANOX 1035," "IRGANOX 1076," "IRGANOX 1098," "IRGANOX 1135," "IRGANOX 1330," "IRGANOX 1726," "IRGANOX 1425 WL," "IRGANOX 1520 L," "IRGANOX 245," "IRGANOX 259," "IRGANOX 3114," "IRGANOX 565," and "IRGAMOD 295" available from BASF Japan Ltd.

Content of the antioxidant in the photocurable resin composition is preferably 0.1 to 10 pts. mass and more preferably 0.5 to 3 pts. mass. These antioxidants may be used individually or in a combination of two or more. In the case of using two or more antioxidants, the total content of these is preferably within the ranges specified above.

Other Components

The photocurable resin composition may contain other components in addition to those mentioned above so long as effects of suppressing discoloration of the polarizing plate of the image display device under a high-temperature environment are not impaired. Examples of other components include tackifiers.

The photocurable resin composition is preferably a liquid at normal temperature. For example, the photocurable resin composition preferably has a viscosity of 0.01 to 100 Pa*s at 25° C. as measured by a Brookfield type viscometer.

The photocurable resin composition preferably has a transmittance of 90% or more in the visible light region. This improves viewing properties of the image formed in the image display member when the cured resin layer is formed.

The photocurable resin composition preferably has a refractive index that is substantially similar to that of the image display member and light transmitting member; for example, the refractive index is preferably more than 1.45 and less than 1.55. This can enhance luminance and contrast of image light from the image display member so that viewing properties are improved.

It is possible to prepare the photocurable resin composition by uniformly mixing the components described above in accordance with known mixing techniques.

The photocurable resin composition according to the present embodiment is capable of suppressing discoloration of the polarizing plate 2 of an image display device 1 under a high-temperature environment by having a water vapor transmission rate of 400 g/m$^2$/day or more after curing, at a thickness of 0.3 mm, and under a 40° C. and 90% relative humidity environment.

Image Display Device

An image display device 1 according to the present embodiment, such as illustrated in FIG. 1, has an image display member 4, a cured resin layer 6, and a light transmitting member 5 in this order, the image display member 4 including a polarizing plate 2. The cured resin layer 6 has a water vapor transmission rate of 400 g/m$^2$/day or more at a thickness of 0.3 mm and under a 40° C. and 90% relative humidity environment. Using a cured resin layer 6 having such a high water vapor transmission rate can suppress discoloration of the polarizing plate 2 under a high-temperature environment.

The image display member 4 is, for example, an image display panel having the polarizing plate 2 formed on the viewing side surface of an image display cell 3. The image display member 4 is, for example, a liquid display panel, an organic EL display panel, or a touch panel. Herein, touch panel means an image display/input panel combining a display element such as a liquid crystal display panel and a position input device such as a touch pad.

Examples of the image display cell 3 include liquid crystal cells and organic EL cells. Examples of liquid crystal cells include reflective liquid crystal cells and transmissive liquid crystal cells.

The polarizing plate 2, such as illustrated in FIG. 2, is a laminated structure including a polarizer 8, a protective layer 9 provided on one side of the polarizer 8, and a protective layer 10 provided on the other side of the polarizer 8. The polarizing plate 2 may further include adhesive layers (not illustrated) between the polarizer 8 and the protective layer 9 as well as between the polarizer 8 and the protective layer 10. Moreover, the polarizing plate 2 may further include optical layers (such as retardation plates) in addition to the polarizer 8 and protective layers 9, 10.

As the polarizer 8, for example, it is possible to use a polarizing plate in a conventional configuration of a polyvinyl alcohol resin subjected to a dyeing treatment with a dichroic substance (such as an iodine compound) and stretching treatment.

As the protective layer 9, 10, for example, films made of thermoplastic resin having excellent transparency, mechanical strength, thermostability, moisture barrier properties, and isotropy can be used. Examples of such thermoplastic resins include cellulose resins such as triacetyl cellulose (TAC), polyester resins such as polyethylene terephthalate (PET) and polyethylene naphthalate (PEN), polyethersulfone resin, polysulfone resin, polycarbonate resin, polyamide resin, polyimide resin, polyolefin resin, (meth)acrylic resin, cyclic polyolefin resin, polyarylate resin, polystyrene resin, and polyvinyl alcohol resin as well as mixtures of these.

The light transmitting member 5 may be in any configuration so long as it is sufficiently transparent to allow visibility of the image formed in the image display member 4. Examples of usable materials include glass, acrylic resin, polyethylene terephthalate, polyethylene naphthalate, and polycarbonate in a plate or sheet shape. These materials may be treated on one or both sides such as with a hard coating or anti-reflective treatment. Physical properties of the light transmitting member 5 such as thickness and elasticity may be selected as appropriate according to use. Moreover, the light transmitting member 5 is not limited to the relatively simple configuration described above but also includes laminated structures incorporating any of a variety of sheet or film materials such as of touch panel modules.

A perimeter area of the light transmitting member 5 may be provided with a light shielding layer 7 to improve contrast. The light shielding layer 7 can be formed, for example, by applying a black or otherwise colored coating material using screen printing, among other methods, and drying/curing the coating material. Thickness of the light shielding layer 7 is typically 5 to 100 μm.

The cured resin layer 6 is a cured product of the photocurable resin composition described above. The cured resin layer 6 has a water vapor transmission rate of 400 g/m$^2$/day or more at a thickness of 0.3 mm and under a 40° C. and 90% relative humidity environment. Ranges of preferable water vapor transmission rates for the cured resin layer 6 are the same as ranges of water vapor transmission rates described for the cured product of the photocurable resin composition.

The cured resin layer 6 preferably has a transmittance of 90% or more in the visible light region. Satisfying this condition can improve viewing properties of the image formed in the image display member 4. The refractive index of the cured resin layer 6 is preferably approximately the same as that of the image display member 4 and the light transmitting member 5. For example, the cured resin layer 6 preferably has a refractive index of 1.45 or more and 1.55 or less. This can enhance luminance and contrast of image light from the image display member 4 and improve viewing properties. Thickness of the cured resin layer 6 may be 25 to 200 μm.

The image display device 1 according to the present embodiment includes the image display member 4, the cured resin layer 6, and the light transmitting member 5, in this order, the image display member 4 including the polarizing plate 2, the photocurable resin composition has a water vapor transmission rate of 400 g/m$^2$/day or more, at a thickness of 0.3 mm, and under a 40° C. and 90% relative humidity environment. By including the cured resin layer 6 having a high water vapor transmission rate, the image display device 1 can suppress discoloration of the polarizing plate 2 under a high-temperature environment.

Image Display Device Manufacturing Method

Hereinafter, a first embodiment and a second embodiment will be described as examples of the method for manufacturing an image display device. It should be noted that the same elements are denoted with the same reference signs in the drawings.

First Embodiment

A manufacturing method according to the first embodiment includes a step (A) of applying a photocurable resin composition to a surface of a light transmitting member, a step (B) of pasting the image display member and the light transmitting member via the photocurable resin composition, and a step (C) of curing the photocurable resin composition.

Step (A)

Figure 3:
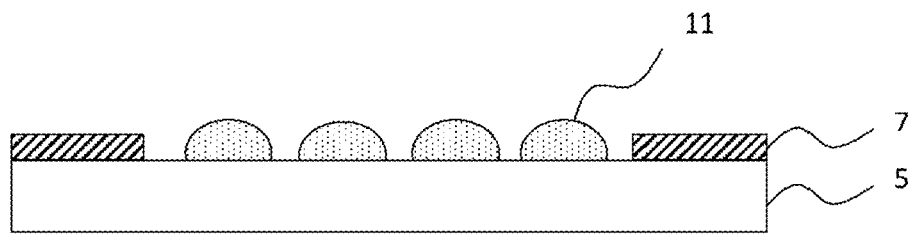
FIG. 3 is a cross-sectional view illustrating one example of a step (A) of a method for manufacturing an image display device.

In step (A), for example as illustrated in FIG. 3, a photocurable resin composition 11 is applied to a surface of a light transmitting member 5 on which a light shielding member 7 is formed. The photocurable resin composition 11 is the same as the photocurable resin composition described above and preferable ranges thereof are also the same.

Step (B)

Figure 4:
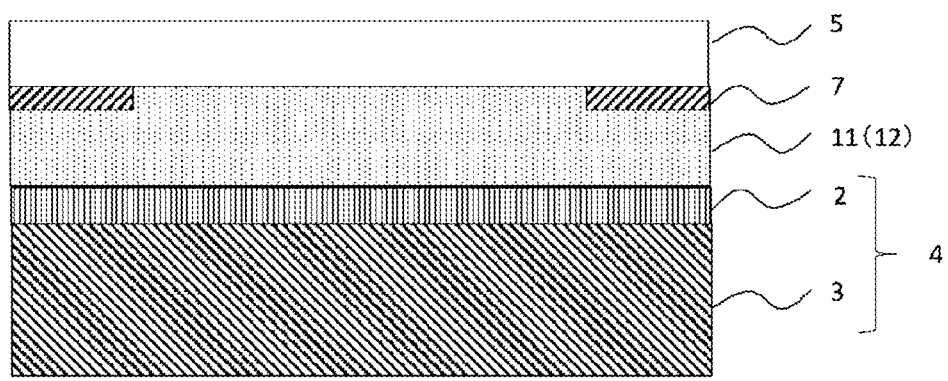
FIG. 4 is a cross-sectional view illustrating one example of a step (B) of a method for manufacturing an image display device.

In step (B), for example as illustrated in FIG. 4, the light transmitting member 5 is pasted onto the image display member 4 on a polarizing plate 2 side via the photocurable resin composition 11. Thus, a photocurable resin composition layer 12 is formed between the polarizing plate 2 and light transmitting member 5.

Step (C)

Figure 5:
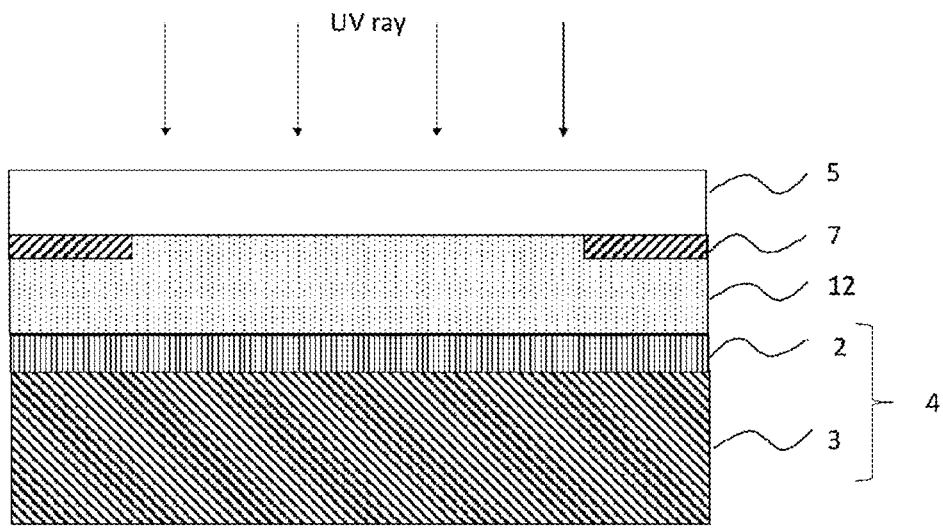
FIG. 5 is a cross-sectional view illustrating one example of a step (C) of a method for manufacturing an image display device.

In step (C), for example as illustrated in FIG. 5, the photocurable resin composition layer 12 is irradiated with light (preferably ultraviolet light) to cure the photocurable resin composition layer 12. Thus, an image display device 1 having the image display member 4 and light transmitting member 5 laminated via a cured resin layer 6 can be manufactured.

Irradiation preferably achieves a reaction percentage (degree of curing) of 90% or higher and more preferably 95% or higher in the cured resin layer 6. Satisfying such a range can improve viewing properties of the image formed in the image display member 4. Reaction percentage for the cured resin layer 6 is the same as that described above.

Conditions for irradiation such as type of light source, output power, illuminance, and radiant exposure are not particularly limited and known conditions for photoradical polymerization of (meth)acrylate using ultraviolet may be employed.

It should be noted that, although applying the photocurable resin composition 11 to a surface of the light transmitting member 5 is described in the first embodiment, the present disclosure is not limited to this example. For example, in step (A), the photocurable resin composition 11 may be applied to a surface of the image display member 4.

Second Embodiment

A manufacturing method according to the second embodiment includes a step (AA) of applying a photocurable resin composition to a surface of a light transmitting member, a step (BB) of pre-curing by irradiating a photocurable resin composition layer with light, a step (CC) of pasting the image display member and light transmitting member via a pre-cured resin layer, and a step (DD) of final-curing the pre-cured resin layer.

Step (AA)

Figure 6:
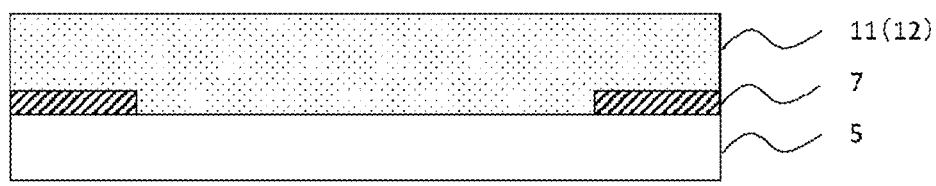
FIG. 6 is a cross-sectional view illustrating one example of a step (AA) of a method for manufacturing an image display device.

In step (AA), for example, as illustrated in FIG. 6, a photocurable resin composition 11 is applied to a surface of a light transmitting member 5 to form a photocurable resin composition layer 12. In particular, it is preferable to apply the photocurable resin composition 11, so as to be flat and avoid generating unevenness, across the entire surface of the light transmitting member 5 on which the light shielding layer 7 is formed, including across the surface of the light shielding layer 7. Thickness of the photocurable resin composition layer 12 is, for example, preferably 1.2 to 50 times and more preferably 2 to 30 times the thickness of the light shielding layer 7. Application of the photocurable resin composition 11 may be as required to achieve sufficient thickness and may be performed one time or multiple times.

Step (BB)

Figure 7:
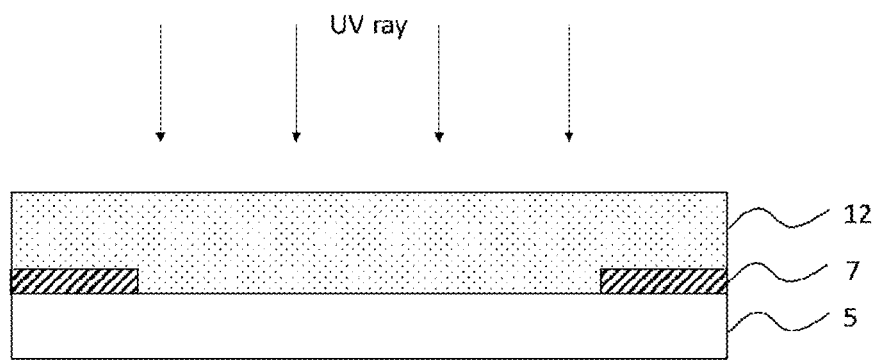
FIG. 7 is a cross-sectional view illustrating one example of a step (BB) of a method for manufacturing an image display device.
Figure 8:
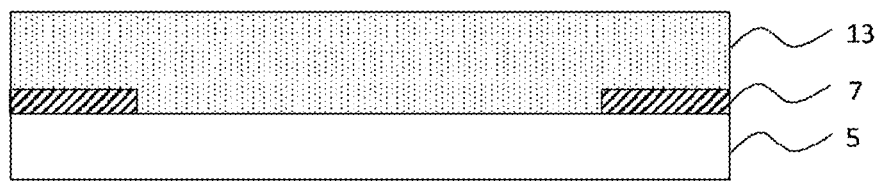
FIG. 8 is a cross-sectional view illustrating one example of a step (BB) of a method for manufacturing an image display device.

In step (BB), for example, as illustrated in FIG. 7, the photocurable resin composition layer 12 formed in step (AA) is pre-cured by irradiating with light (preferably ultraviolet light) to form a pre-cured resin layer 13 as illustrated in FIG. 8.

The photocurable resin composition layer 12 is pre-cured to a reaction percentage in the pre-cured resin layer 13 of preferably 10 to 80% and more preferably 40 to 80%. Irradiation conditions are without particular limitation so long as the pre-cured resin layer 13 is cured, preferably to a reaction percentage of 10 to 80%.

Step (CC)

Figure 9:
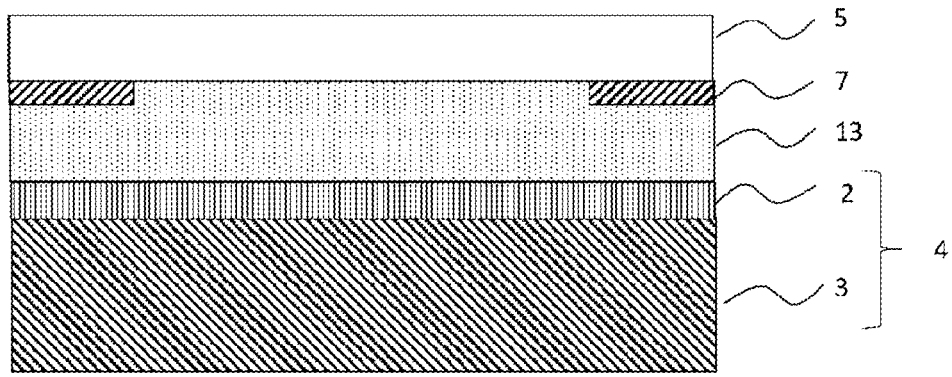
FIG. 9 is a cross-sectional view illustrating one example of a step (CC) of a method for manufacturing an image display device.

In step (CC), for example, as illustrated in FIG. 9, the image display member 4 and light transmitting member 5 are pasted via the pre-cured resin layer. For example, pasting may employ known compression bonding devices to apply pressure at 10 to 80° C.

Step (DD)

Figure 10:
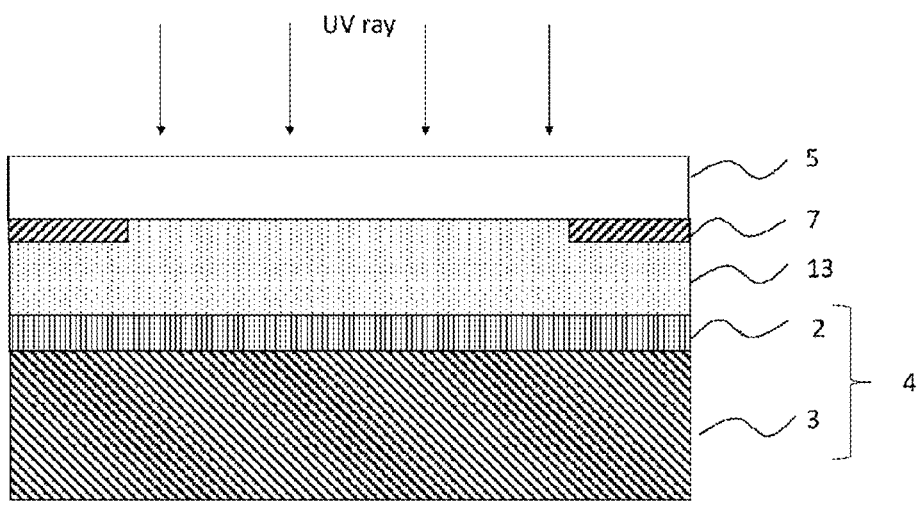
FIG. 10 is a cross-sectional view illustrating one example of a step (DD) of a method for manufacturing an image display device.

In step (DD), for example, as illustrated in FIG. 10, the pre-cured resin layer 13 is final-cured by irradiating with light (preferably ultraviolet light). Thus, an image display device 1 (refer to FIG. 1) having the image display member 4 and light transmitting member 5 laminated via the cured resin layer 6 can be manufactured.

Final curing of the pre-cured resin layer 13 preferably achieves a 90% or higher and more preferably 95% or higher reaction percentage in the cured resin layer 6. Final-curing conditions are without particular limitation so long as the cured resin layer 6 can be cured to a reaction percentage of 90% or more.

It should be noted that, although applying the photocurable resin composition 11 to a surface of the light transmitting member 5 on which the light shielding layer 7 is formed is described in the second embodiment, the present disclosure is not limited to this example, and the photocurable resin composition 11 may be applied to a surface of the image display member 4.

In the method for manufacturing an image display device above, although a case of using a light transmitting member 5 provided with a light shielding member 7 is described, the present disclosure is not limited to this example. For example, a light transmitting member without the light shielding member 7 may be used to manufacture an image display device.

Moreover, the method for manufacturing an image display device may use a process known as dam and fill. For example, a method using a dam and fill process includes using a dam material to define an application region for the fill material on a surface of the image display member, applying the fill material onto the application region before pasting the image display member and light transmitting member via the fill material, and irradiating the fill material with light to form a cured resin layer.

EXAMPLES

Figure 11:
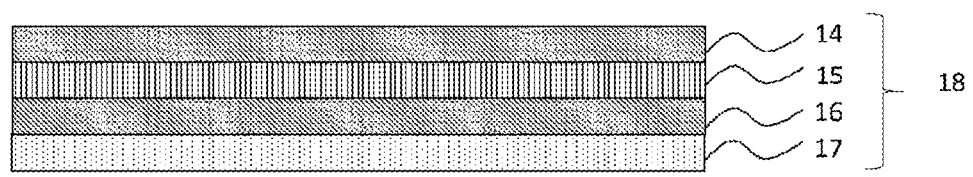
FIG. 11 is a cross-sectional view schematically illustrating a polarizing plate.

Hereinafter, examples according to the present disclosure will be described.
(Meth)acrylate Resin
ART RESIN UN-6202: polyether skeleton urethane acrylate oligomer, Negami Chemical Industries Co., Ltd.
ART RESIN UN-7700: polyester skeleton urethane acrylate oligomer, Negami Chemical Industries Co., Ltd.
TE-2000: polybutadiene skeleton urethane methacrylate oligomer, Nippon Soda Co., Ltd.
Monofunctional Monomer
4-HBA: 4-hydroxybutyl acrylate, Osaka Organic Chemical Industry Ltd.
ACMO: acryloyl morpholine, KJ Chemicals Corporation
Viscoat #150: tetrahydrofurfuryl acrylate, Osaka Organic Chemical Industry Ltd.
MEDOL-10: (2-methyl-2-ethyl-1,3-dioxolane-4-yl) methyl acrylate, Osaka Organic Chemical Industry Ltd.
New Frontier PGA: phenyl glycidyl ether acrylate, DKS Co. Ltd.
SR506: isobornyl acrylate, Arkema Corporation
Plasticizer
Adeka Polyether P-3000: polyether polyol, ADEKA CORPORATION
Kuraray Polyol P-3010: polyester polyol, KURARAY CO., LTD.
Krasol LBH-P3000: polybutadiene polyol, Cray Valley
Antioxidant
Irganox 1135: octyl 3-(4-hydroxy-3,5-diisopropylphenyl) propionate, BASF Japan Ltd.
Photoinitiator
Irgacure 184: 1-hydroxycyclohexyl phenyl ketone, BASF Japan Ltd.
Photocurable Resin Composition Preparation Photocurable resin compositions were prepared for Examples and Comparative Examples by uniformly mixing respective components in accordance with the blending amounts (pts. mass) given in Table 1 below.
Polarizing Plate Discoloration Test As illustrated in FIG. 11, polarizing plates 18 (Polatechno Co., Ltd.) having an 80 μm-thick TAC layer 14, a 30 μm-thick PVA layer 15, an 80 μm-thick TAC layer 16, and a 25 μm-thick acrylic adhesive agent layer 17, in this order, were prepared.

Figure 12:
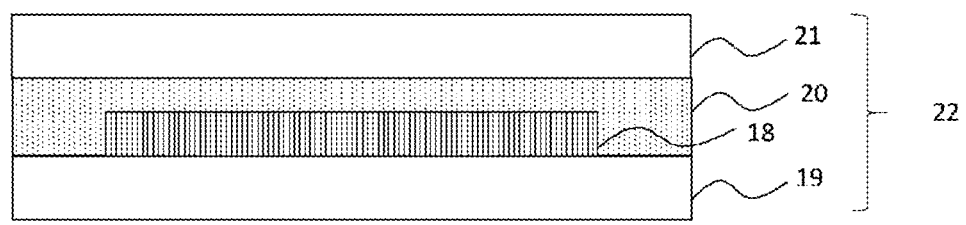
FIG. 12 is a cross-sectional view schematically illustrating a bonded glass body.

As illustrated in FIG. 12, a glass plate 19 having a thickness of 1.1 mm was pasted via the acrylic adhesive agent layer 17 of the polarizing plate 18. Moreover, the photocurable resin compositions 20 were applied dropwise onto the glass plates 19 pasted to the polarizing plates 18 before mounting 1.1 mm-thick glass plates 21 onto the applied photocurable resin compositions 20; the glass plates 21 were thus pasted under their own weight. As a result, bonded glass bodies 22 were obtained.

Figure 13:
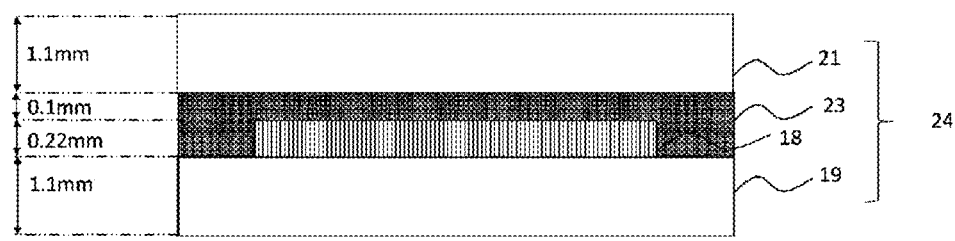
FIG. 13 is a cross-sectional view schematically illustrating a sample image display device.

Using an ultraviolet irradiation device, the bonded glass bodies 22 were irradiated from the glass plate 21 side to a radiant exposure of 5,000 mJ/cm$^2$ to cure the photocurable resin compositions 20 and form cured resin layers 23 and thus prepare sample image display devices 24 as illustrated in FIG. 13. The maximum thickness of the cured resin layers 23 formed between the glass plates 19 and the glass plates 21 was 0.3 mm. Moreover, thickness of the cured resin layers 23 formed between the polarizing plates 18 and the glass plates 21 was 0.1 mm. The reaction percentage of the cured resin layers 23 was 90% or higher.

Figure 14:
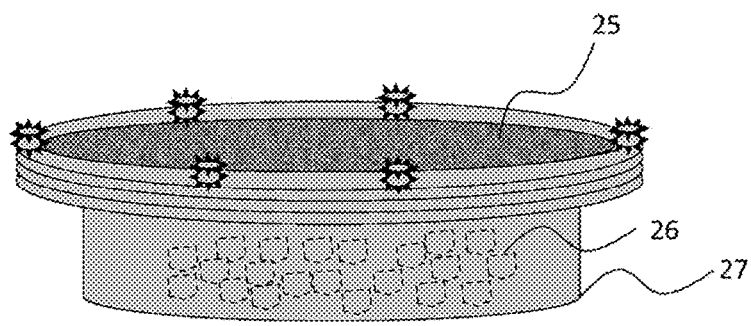
FIG. 14 illustrates a testing method for determining a water vapor transmission rate.

The image display devices 24 were left in a 100° C. environment for 240 hours. After leaving to stand for 240 hours, the polarizing plates 18 of the image display devices 24 were visually evaluated for discoloration. Polarizing plates 18 determined to have no discoloration were evaluated as PASS and polarizing plates 18 determined to have discoloration were evaluated as FAIL. Results are displayed in Table 1.
Water Vapor Transmission Rate Evaluation The water vapor transmission rates of the cured resin layers were evaluated in accordance with JIS Z 0208 (water vapor transmission dish method). The photocurable resin compositions were irradiated with ultraviolet light to a radiant exposure of 5,000 mJ/cm$^2$ to prepare cured resin layers having a thickness of 0.3 mm. These cured resin layers 25 were set in a dish 27 containing calcium chloride 26 as illustrated in FIG. 14 which were then placed in a temperature controlled chamber at 40° C. and 90% relative humidity and left to stand for 24 hours before measuring mass increase of the calcium chloride to determine the water vapor transmission rates of the cured resin layers 25.

In the following table, "*" indicates that incompatibility in the photocurable resin composition caused separation of individual components so that cured resin layers did not form and each of the evaluations were impossible.

TABLE 1

| | | Ex. 1 | Ex. 2 | Ex. 3 | Ex. 4 | Ex. 5 | Ex. 6 | Ex. 7 | Ex. 8 | Comp. 1 | Comp. 2 | Comp. 3 | Comp. 4 | Comp. 5 | Comp. 6 |
|---|---|---|---|---|---|---|---|---|---|---|---|---|---|---|---|
| (Meth)acrylate resin | ART RESIN UN-6202 | 40 | 40 | 40 | 40 | 40 | 40 | — | 40 | 40 | 40 | 40 | — | — | — |
| | ART RESIN UN-7700 | — | — | — | — | — | — | 40 | — | — | — | — | — | — | — |
| | TE-2000 | — | — | — | — | — | — | — | — | — | — | — | 40 | 40 | 40 |
| Monofunctional monomer | 4HBA | 30 | — | — | — | 15 | — | 30 | 30 | — | — | 30 | 30 | — | — |
| | ACMO | — | 30 | — | — | — | — | — | — | — | — | — | — | — | — |
| | VISCOAT #150 | — | — | 30 | — | — | — | — | — | — | — | — | — | — | — |
| | MEDOL-10 | — | — | — | 30 | — | — | — | — | — | — | — | — | — | — |
| | New Frontier PGA | — | — | — | — | — | 30 | — | — | — | — | — | — | — | — |
| | SR506 | — | — | — | — | 15 | — | — | — | 30 | 30 | — | — | 30 | 30 |

TABLE 1-continued

| | | Ex. 1 | Ex. 2 | Ex. 3 | Ex. 4 | Ex. 5 | Ex. 6 | Ex. 7 | Ex. 8 | Comp. 1 | Comp. 2 | Comp. 3 | Comp. 4 | Comp. 5 | Comp. 6 |
|---|---|---|---|---|---|---|---|---|---|---|---|---|---|---|---|
| Plasticizer | Adeka Polyether P-3000 | 30 | 30 | 30 | 30 | 30 | 30 | 30 | — | 30 | — | — | — | 30 | — |
| | Krasol LBH-P3000 | — | — | — | — | — | — | — | — | — | 30 | 30 | 30 | — | 30 |
| | Kuraray Polyol P-3010 | — | — | — | — | — | — | — | 30 | — | — | — | — | — | — |
| Antioxidant | Irganox 1135 | 1 | 1 | 1 | 1 | 1 | 1 | 1 | 1 | 1 | 1 | 1 | 1 | 1 | 1 |
| Photoinitiator | Irgacure 184 | 1 | 1 | 1 | 1 | 1 | 1 | 1 | 1 | 1 | 1 | 1 | 1 | 1 | 1 |
| | Total | 102 | 102 | 102 | 102 | 102 | 102 | 102 | 102 | 102 | 102 | 102 | 102 | 102 | 102 |
| Evaluation | Water vapor transmission rate (40° C./90% RH) [g/m²/day] | 870 | 710 | 662 | 595 | 594 | 492 | 534 | 681 | 390 | 119 | * | * | * | 17 |
| | Polarizing plate discoloration (100° C./240 h) | PASS | PASS | PASS | PASS | PASS | PASS | PASS | PASS | FAIL | FAIL | * | * | * | FAIL |

It was found that, because the photocurable resin compositions used in Examples had water vapor transmission rates of 400 g/m²/day or more after curing, at a thickness of 0.3 mm, and under a 40° C. and 90% relative humidity environment, discoloration of the polarizing plates under a high-temperature environment could be suppressed.

In contrast, it was found that, because the photocurable resin compositions used in Comparative Examples 1, 2, and 6 had water vapor transmission rates of less than 400 g/m²/day after curing, at a thickness of 0.3 mm, and under a 40° C. and 90% relative humidity environment, it was not possible to suppress discoloration of the polarizing plate under a high-temperature environment. It should be noted that, due to incompatibility in the photocurable resin compositions used in Comparative Examples 3 to 5, it was not possible to form cured resin layers so that evaluation of water vapor transmission rates in cured products and discoloration of polarizing plates was impossible.

REFERENCE SIGNS LIST 1 image display device, 2 polarizing plate, 3 image display cell, 4 image display member, 5 light transmitting member, 6 cured resin layer, 7 light shielding member, 8 polarizer, 9 protective layer, 10 protective layer, 11 photocurable resin composition, 12 photocurable resin composition layer, 13 pre-cured resin layer, 14 TAC layer, 15 PVA layer, 16 TAC layer, 17 acrylic adhesive agent layer, 18 polarizing plate, 19 glass plate, 20 photocurable resin composition, 21 glass plate, 22 bonded glass body, 23 cured resin layer, 24 image display device, 25 cured resin layer, 26 calcium chloride, 27 dish, 100 image display device, 101 cured resin layer

The invention claimed is:

1. An image display device comprising an image display member, a cured resin layer, and a light transmitting member, in this order, the image display member including a polarizing plate that is in contact with the cured resin layer, wherein the cured resin layer has a water vapor transmission rate of 594 g/m²/day or more, at a thickness of 0.3 mm, and under a 40° C. and 90% relative humidity environment,
wherein the cured resin layer is a cured product of a photocurable resin composition containing a monofunctional monomer that includes a heterocycle-containing (meth)acrylate monomer, and a (meth)acrylate resin, wherein the (meth)acrylate resin contains at least one of a polyether urethane (meth)acrylate oligomer and a polyester urethane (meth)acrylate oligomer, wherein a content of the heterocycle-containing (meth)acrylate monomer in the photocurable resin composition is 20 to 40% by mass,
wherein the heterocycle-containing (meth)acrylate monomer contains a heterocycle selected from the group consisting of morpholine rings, furan rings and dioxalane rings, but is not tetrahydrofurfuryl (meth)acrylate, and
wherein the polarizing plate includes a dyed polyvinyl alcohol resin-based polarizer, and has no visible discoloration even after the image display device is left in a 100° C. environment for 240 hours.

2. The image display device according to claim 1, wherein the photocurable resin composition further contains a photoinitiator, and a plasticizer.

3. The image display device according to claim 2, wherein a content of the (meth)acrylate resin in the photocurable resin composition is 5 to 50% by mass.

4. The image display device according to claim 2, wherein the plasticizer contains at least one of a polyether polyol and a polyester polyol.

5. The image display device according to claim 2, wherein a content of the plasticizer in the photocurable resin composition is 15 to 50% by mass.

6. The image display device according to claim 2, wherein the photocurable resin composition further comprises an antioxidant.

7. The image display device according to claim 1, wherein the image display member is an image display panel in which the polarizing plate is formed on a viewing side surface of an image display cell.

8. The image display device according to claim 1, wherein the cured resin layer has a water vapor transmission rate of 700 g/m²/day or more, at a thickness of 0.3 mm, and under a 40° C. and 90% relative humidity environment.

9. The image display device according to claim 1, wherein all components of each of the photocurable resin composition and the cured resin layer have good compatibility.

* * * * *